United States Patent
Jain et al.

(10) Patent No.: US 8,166,412 B2
(45) Date of Patent: Apr. 24, 2012

(54) VISUAL CUE DISCERNMENT ON SCATTERED DATA

(75) Inventors: Kapil Jain, Noida (IN); Rithesh R. Prasad, Coimbatore (IN); Abhinav Chakravarty, Noida (IN); Yhenishetty Jagadish, Hyderabad (IN)

(73) Assignee: Adobe Systems Incorporated, San Jose, CA (US)

( * ) Notice: Subject to any disclaimer, the term of this patent is extended or adjusted under 35 U.S.C. 154(b) by 858 days.

(21) Appl. No.: 11/408,403

(22) Filed: Apr. 21, 2006

(65) Prior Publication Data

US 2007/0168877 A1    Jul. 19, 2007

(30) Foreign Application Priority Data

Jan. 13, 2006  (IN) ............... 97/DEL/2006

(51) Int. Cl.
  *G06F 3/048* (2006.01)
  *G06F 3/00* (2006.01)
(52) U.S. Cl. ......... 715/772; 715/700; 715/764; 715/811
(58) Field of Classification Search .................. 715/700, 715/745, 764, 772, 789, 811, 859
  See application file for complete search history.

(56) References Cited

U.S. PATENT DOCUMENTS

| | | |
|---|---|---|
| 5,103,498 A | 4/1992 | Lanier et al. |
| 5,420,975 A | 5/1995 | Blades et al. |
| 5,526,443 A | 6/1996 | Nakayama |
| 5,564,004 A | 10/1996 | Grossman et al. |
| 5,691,744 A | 11/1997 | Anstotz et al. |
| 5,745,715 A | 4/1998 | Pickover et al. |
| 5,799,292 A | 8/1998 | Hekmatpour |
| 5,852,440 A | 12/1998 | Grossman et al. |
| 5,963,964 A * | 10/1999 | Nielsen .................. 715/255 |
| 6,052,676 A | 4/2000 | Hekmatpour |
| 6,088,707 A * | 7/2000 | Bates et al. ............ 715/235 |
| 6,154,752 A * | 11/2000 | Ryan ..................... 715/202 |
| 6,583,797 B1 * | 6/2003 | Roth ...................... 715/810 |
| 6,646,659 B1 | 11/2003 | Brown et al. |
| 6,848,075 B1 * | 1/2005 | Becker et al. .......... 715/205 |
| 6,928,425 B2 | 8/2005 | Grefenstette et al. |
| 2002/0075302 A1 * | 6/2002 | Simchik ................. 345/745 |
| 2003/0189586 A1 * | 10/2003 | Vronay et al. .......... 345/700 |
| 2003/0195877 A1 * | 10/2003 | Ford et al. .................. 707/3 |
| 2004/0056901 A1 | 3/2004 | March et al. |
| 2005/0044508 A1 * | 2/2005 | Stockton ................. 715/811 |
| 2005/0086634 A1 * | 4/2005 | Bates et al. ............. 717/101 |
| 2005/0138574 A1 | 6/2005 | Lin |
| 2006/0048064 A1 * | 3/2006 | Vronay ................... 715/764 |
| 2006/0195785 A1 * | 8/2006 | Portnoy et al. ......... 715/700 |

* cited by examiner

*Primary Examiner* — Tadeese Hailu
*Assistant Examiner* — Yongjia Pan
(74) *Attorney, Agent, or Firm* — Van Pelt, Yi & James LLP

(57) ABSTRACT

Displaying a visual cue is disclosed. A value of an attribute for a member of a set of data is obtained. The visual cue for the member is determined based at least in part on the value of the attribute. The visual cue for the member is displayed, where the visual cue provides an indication of an ordering associated with the set of data.

27 Claims, 13 Drawing Sheets

Adobe enterprise solutions: Create high-quality documents - Microsoft Internet Explorer

File   Edit   View   Favorites   Tools   Help

⬅ Back ▼ ➡ ▼ ⊗ 🗋 🏠 | 🔍 Search 📁 Favorites 🎭 Media 🎨 | 📇 ▼ 🖨 📝 ▼ 📋

Address 🔗 http://www.adobe.com/enterprise/create.html

[▼] 🔍 Search Web ▼ | ⬅ ➡ | 📚 | ☺ ☹ PageRank

🛒 | Search | Contact Us

Adobe              Products    Solutions    Support    Purchase

< Enterprise

504

Enterprise solutions

Customer stories (Yellow)

Enterprise partners

Analyst reports (Red)

Events & seminars

500

Industries

▶ Government

▶ Financial services (Red)

▶ Manufacturing

502

Cross-industry solutions

ECM

ERP

▶ PLM (Yellow)

DOM

▶ Corporate governance

506

Infrastructure

Intelligent Document
Platform

PDF

Create high-quality documents

Documents are the most common means of communication between you and your customers, employees, suppliers, and partners. Every day, you use documents - such as invoices and statements - to conduct transactions or transfer knowledge through materials such as user manuals and catalogs. As a result, customer satisfaction depends on the effectiveness and usability of your documents.

Key challenges

The key challenges to creating high-quality documents are:

- High-quality outbound communications must be personalized and delivered in a format that suits customer needs.
- Costs escalate with custom programming or preprinted forms.
- Manual document production involves inefficient processes.

The solution

The Adobe® Intelligent Document Platform enables you to create high-quality documents to make business interactions more effective. It enables enterprises to dynamically merge content from enterprise applications - including data, text, and images - with flexible templates to generate personalized Intelligent Documents for delivery anytime, anywhere, on any device. The platform also gives you the power to assemble multiple diverse documents into a single, compact Adobe Portable Document Format (PDF) file that is professional

FIG. 5

VISUAL CUE DISCERNMENT ON SCATTERED DATA

CROSS REFERENCE TO OTHER APPLICATIONS

This application claims priority to India Patent Application No. 97/DEL/2006 entitled VISUAL CUE DISCERNMENT ON SCATTERED DATA filed Jan. 13, 2006 which is incorporated herein by reference for all purposes.

BACKGROUND OF THE INVENTION

Many devices visually display a set of data to a user. The set of data can be a set of Uniform Resource Locator (URL) hyperlinks displayed in a webpage, a broadcast schedule of programs displayed by a television or a recording device coupled to the television, or a list of contacts displayed by a cellular phone. It may be desirable for a user to be able to distinguish between members of the set of data. However, existing techniques to provide distinction between members of a set of data may have drawbacks. In some cases, there may be a particular layout or ordering associated with a display and it may be undesirable to rearrange the display. In some cases, the display area is small and it may be difficult to add new objects to a display. Techniques that address these issues may be useful.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the invention are disclosed in the following detailed description and the accompanying drawings.

FIG. 5 illustrates an embodiment of using colored highlights as visual cues for hyperlinks in a webpage.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Displaying a visual cue is disclosed. A value of an attribute is obtained for a member of a set of data. In some embodiments, the attribute is specified by a user. The attribute may be associated with an access count or a period of time in some embodiments. The visual cue for the member is determined based at least in part on the value of the attribute. In some embodiments, bins are used to determine the visual cue, where each bin is associated with a particular range of values for the attribute. The visual cue for the member is displayed, where the visual cue provides an indication of an ordering of the members of the set of data.

Figure 1:
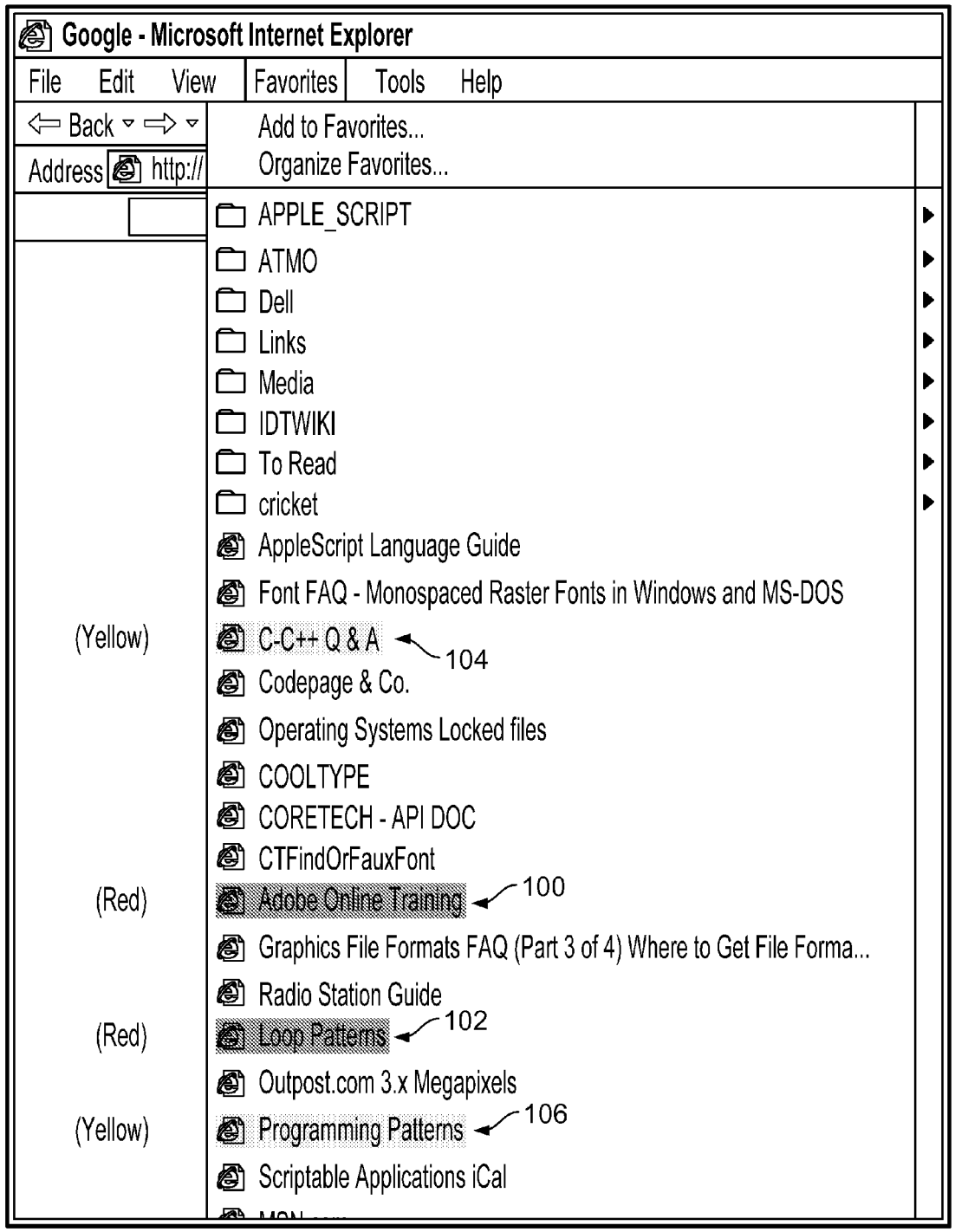
FIG. 1 illustrates an embodiment of using colored highlight as visual cues for a list of bookmarks.

FIG. 1 illustrates an embodiment of using colored highlights as visual cues for a list of bookmarks. In the example shown, a list of bookmarks is displayed in a pull down menu of an internet browser application. To distinguish between the bookmarks in the list, a colored highlight appears over some of the bookmarks in the list. The presence of a highlight and its color indicates an ordering of the bookmarks and is based on a characteristic or property associated with the bookmark. In this example, frequency of usage is indicated by a colored highlight or lack thereof. Adobe online training bookmark 100 and loop patterns bookmark 102 have red highlights, indicating that those bookmarks are the most frequently used bookmarks in the list. Bookmarks that are moderately used are highlighted in yellow and include the C-C++ Q&A bookmark 104 and programming patterns bookmark 106. Bookmarks without a highlight are used the least frequently of the bookmarks in the list.

The characteristic or property upon which a visual cue is based may be a hidden property and may be unrelated to any display value or data. In the example of this figure, display values or data associated with a bookmark include the name assigned to the bookmark, "Adobe online training" and the corresponding Uniform Resource Locator, which do not affect the colored highlights.

There may be a variety of benefits associated with displaying visual cues. With a visual cue, a user may be able to more quickly sort through a set of data. The user may want to locate a particular bookmark in the list, and the desired bookmark is likely to be a bookmark that is frequently used. Visual cues such as colored highlights may enable a user to find a desired bookmark more quickly and/or easily. A visual cue can be non-disruptive while providing a user with information about a set of data. In the example shown, the height and width of the pull down menu are maintained even with the visual cues displayed. Non-disruptive visual cues may be useful for devices with small or limited displays (such as cell phones, personal digital assistants, portable media players, and handheld gaming devices). It is also not necessary to reorder a set of data when displaying a visual cue. In this example, the ordering of the list of bookmarks is maintained. This may be useful if a user is expecting a particular ordering or layout. Turning on and turning off a visual cue may also be less jarring if the layout or an ordering is maintained.

In this example, the visual cue is based on a relative scale where frequency of usage for a given member is evaluated with respect to frequencies of usage for other members. That is, red highlights indicate bookmarks that are the most frequently used of the bookmarks in the list. However, the user may use the list of bookmarks infrequently. Although the visual cues for bookmarks 100 and 102 indicate they are used the most frequently of all the bookmarks in the list, bookmarks 100 and 102 may only have been used a few times. In some embodiments, the visual cue is based on an absolute scale. For example, the color may represent the number of times the bookmark was used over the past week. No highlight may indicate a bookmark was used 10 or fewer times in the past week, a yellow highlight may indicate a bookmark was used 11-20 times in the past week, and a red highlight may indicate a bookmark was used 21+ times in the last week. There may be some cases in which no bookmarks have a red highlight.

The illustrated figure is one of many embodiments of visual cues. Visual cues can take on a variety of forms other than colored highlights and can be used with sets of data other than a list of bookmarks. There are a variety of applications in which visual cues convey an ordering without necessarily reordering or changing a layout. The following figures illustrate some other embodiments of visual cues.

Figure 2:
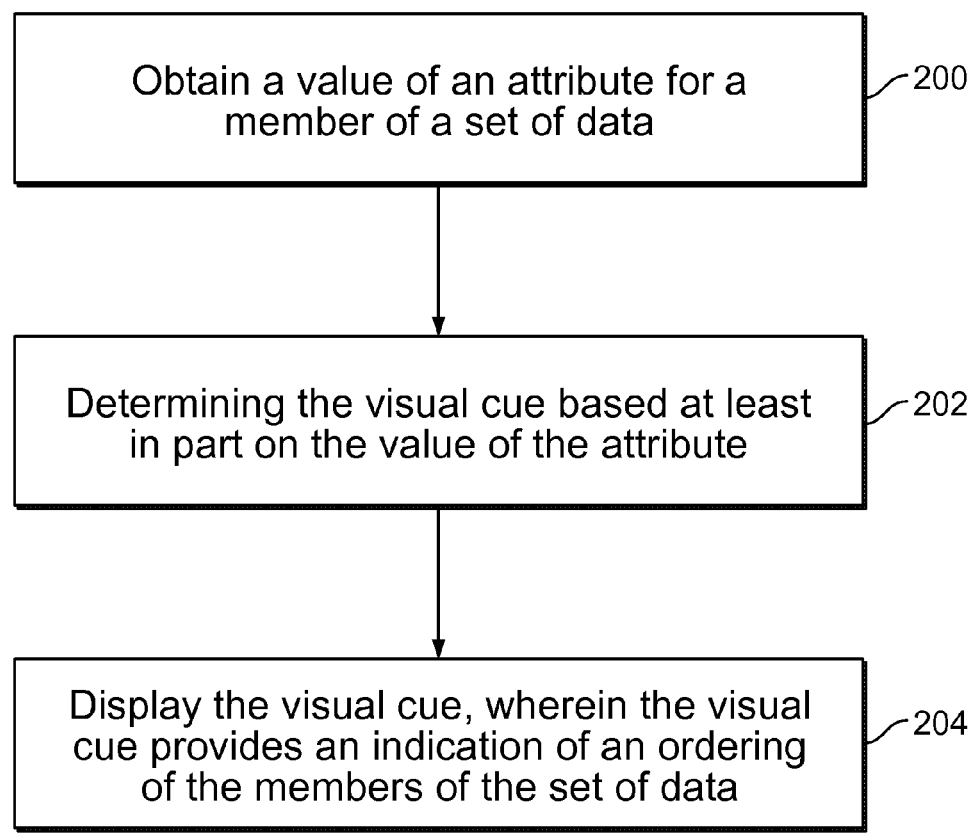
FIG. 2 is a flow chart illustrating an embodiment of a displaying a visual cue.

FIG. 2 is a flow chart illustrating an embodiment of a displaying a visual cue. In the example shown, a set of data is displayed to a user. The set of data may include: files in a directory, bookmarks of websites, a collection of songs, images/photographs, a table of contents for a document, or hyperlinks included in a webpage. The set of data is displayed in some visual context, which is referred to as a data view. The data view may be a window or frame of reference in which the set of data is displayed. For example, if the set of data comprises files in a directory, the data view may be a file explorer window with files represented using graphical representations. In some embodiments, graphical representations are not used to represent files. The data view may include a command window. A command line interface may be used to list files in a directory, for example by entering a "dir" or "ls" command. Some other data views include a webpage with hyperlinks, a frame showing a table of contents, a pull down menu that lists bookmarks, a telephone book of a cellular phone, a list of players of a game, or a list of contacts in an instant messaging application.

At 200, a value of an attribute for a member of a set of data is obtained. An attribute may be some characteristic or property associated with the member of the set of data. For example, the attribute may be the size of a file, an access time, an access count, or a modification date. In some embodiments, the member of the set of data is an audiovisual file. The attribute may be a ranking, a play count, a time duration, the size of the file, an artist name, whether the file is encoded in a particular format, etc. In some embodiments, the set of data includes entries in a telephone book stored on a cellular phone. The attribute may be the number of times a call was exchanged with a particular telephone book entry in the last 7 days, or the number of minutes used. In some embodiments, the attribute is security related (no security, encrypted, password protected, etc.) or related to associated metadata, tags or comments. Table 1 illustrates some examples of data views, sets of data, and attributes.

TABLE 1

| Data View | Set of data | Attribute |
| --- | --- | --- |
| File explorer window | Files | Last accessed Date |
| | | Access count |
| | | Modification Date |
| HTML webpage | Hyperlink URLs | Last accessed Time |
| | Bookmarks of webpages | Access count |
| | | Page Rank of URL |
| PDF file | Bookmarks | Last accessed Time |
| | Table of Contents | Access count |
| | | Creation date |
| | | Number of modifications |
| | | Number of contributors |
| Media Player Application Portable Media Player | Play list entries | Favorite ranking (Third party ranking or user assigned) |
| | | Play count |
| | | Time duration |
| | | File size |
| | | Artist name (Alphabetic ordering) |
| | | Tempo |
| Cellphone | Contact list | Most Frequently Dialed |
| | | Minutes Spent |
| | | Time of Last Received Call |
| | | Time of Last Missed Call |
| Instant messenger | Contact list | Most Frequently Contacted |
| | | Last Contacted |
| | | Time logged on |

TABLE 1-continued

| Data View | Set of data | Attribute |
|---|---|---|
| Email client | Contact List<br>List of email messages | Number of emails exchanged<br>Number of forwards/replies in a email message<br>Transmit/Receive time<br>Number of recipients |
| Source control systems | File List<br>User List<br>Client List | Time since last change<br>Number of changes<br>Number of users who have made a change<br>Number of users with access |
| E-commerce website | List of Items<br>List of Sellers | Price of item<br>Satisfaction rating<br>Number of bids<br>Number of sales<br>Number of times accessed |
| Games | List of players<br>List of characters<br>Game sessions | Score<br>Rank<br>Number of times played<br>Number of milestones achieved |
| Television viewing<br>Television recording device | List of programs to record<br>List of recordings<br>Broadcast schedule | Time duration<br>Broadcast date<br>Nielson rating |

In some embodiments, the set of data is a non-homogenous set of data. For example, the data view may be a document and the set of data may comprise of text and images that are included in the document. Visual cues can be displayed for text and images. In another example, visual cues can be used with a set of data that comprises files and directories associated with a particular directory of a file system.

A visual cue is determined based at least in part on the value of the attribute at 202. A visual cue provides an indication of an ordering of the set of data. Using a visual cue, a viewer can visually distinguish between members of a set of data. In some embodiments, a finite number of bins are defined. Each bin may be associated with a range of values and based on the value of the attribute obtained at 200, a member is assigned to one of the bins. Each bin has a visual cue associated with it, and the visual cue associated with the bin is the visual cue used. In some embodiments, bins are not used and an infinite number of possible visual cues can be generated at 202. For example, a visual cue may be based on a continuously varying gradient. A gradient on which a visual cue is based may comprise a gradient of colors for highlights, a gradient of font sizes, a gradient of border thicknesses, etc. A function may be used, where the value of the attribute obtained at 200 is an input to the function, and the function generates a visual cue value.

A user may have some degree of control over step 202. In some embodiments, a user can control the type of visual cue. For example, a user may select between using font color or a colored highlight as the visual cue. In some embodiments, a user can control a color used in a visual cue. A user may specify or select a color to indicate members that have a particular value of an attribute. For example, a color may be selected by a user to indicate the member(s) with the lowest value(s) of an attribute.

At 204, the visual cue is displayed where the visual cue provides an indication of an ordering of the members of the set of data. Display of the visual cue can be managed by a user to some degree. In some embodiments, a user may turn on or turn off display of a visual cue. The set of data may still be displayed even if a visual cue is turned off. In some embodiments, visual cues can be updated automatically without user interaction. For example, the value of an attribute may change because a user interacts or modifies a member of the set of data. A new visual cue may be determined and displayed automatically. In some embodiments, the visual cue is a real time visual cue. In some embodiments, visual cues are updated at defined points. These defined points may be defined in time (for example, every minute), or may be defined by an event (for example, closing a file triggers a visual cue to be updated).

A visual cue does not necessarily change the relative placement of members of a set of data in a data view. Visual cues that do not change the relative placement of objects in a display or the size of a display window may be referred to as non-disruptive visual cues. Some examples of non-disruptive visual cues include font color, a highlight, a progress bar, and font transparency. In some embodiments, visual cues are disruptive. Disruptive visual cues may affect a layout or cause a change in size of a display window. Visual cues such as varying font size, font weight, the thickness of a border, or the thickness of an underline can be disruptive.

In some embodiments, visual cues are rendered on a separate layer. This separate layer may be in the foreground or in the background of the data view, and can be composited with the data view. A visual cue may not necessarily be applied on the layer that contains the data view. Visual cues that can be rendered on a separate layer include non-disruptive visual cues.

In some embodiments, the visual cue is time varying. For example, the visual cue may be text or a graphical representation (such as an icon or thumbnail) blinking, fading in/out, contorting, contracting, or moving. A periodicity or range of movement associated with a time varying visual cue may be based on the value of an attribute. For example, a faster rate of flashing may be used to indicate files that have been modified more recently. Files modified in the distant past may not necessarily flash. In another example, a range of contraction may vary based on the value of an attribute.

Figure 3:
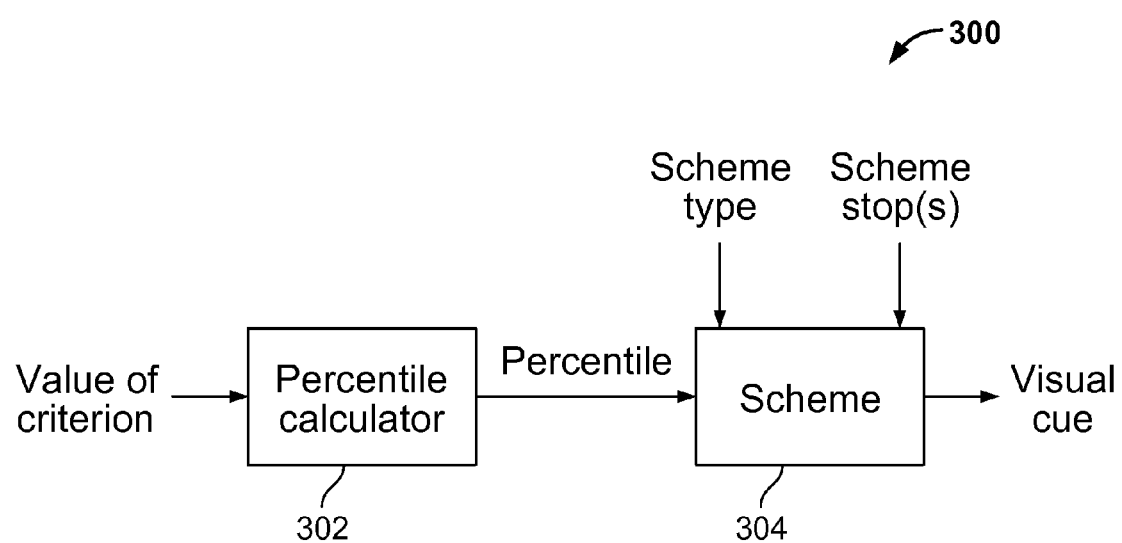
FIG. 3 is a system diagram illustrating an embodiment of a system for determining a visual cue based on the value of an attribute.

FIG. 3 is a system diagram illustrating an embodiment of a system for determining a visual cue based on the value of an attribute. In the example shown, visual cue generator 300 may be used to perform step 202. Visual cue generator 300 includes percentile calculator 302. Values of attributes for members of a set of data are passed to percentile calculator 302. Percentile calculator 302 generates a percentile between 0 and 100 for each member of the set of data. In some cases, a percentile value of 0 is output for the member with the lowest value of an attribute and a percentile value of 100 is output for the member with the highest value of the attribute. Interpolation or another appropriate technique may be used to obtain percentile values for members of the set of data with intermediate values of the attribute.

The percentile values are passed to scheme block 304 which outputs a visual cue. A scheme type and a scheme stop are input to scheme block 304 and can be obtained from a user. In some embodiments, the scheme type and/or the scheme stops are obtained from a process or device rather than the user. Using the scheme type and scheme stop inputs, the form a visual cue takes and some values of the visual cue for that form may be controlled.

The input scheme type controls the form a visual cue takes. For example, the scheme type may specify whether the visual cue is a border of varying thickness or a varying degree of transparency for a graphical representation or text. A user may be able to select a scheme type from a presented list. In some embodiments, two visual cues are displayed simultaneously for each member of the set of data. A user may be able to specify scheme types for both visual cues.

The scheme type input may be used to specify whether the visual cue is determined using bins. A number of bins may be defined where each of the bins is associated with a particular percentile range and a particular visual cue. Using bins, a finite number of possible visual cues are output by scheme block 304. In some embodiments, an infinite number of possible visual cues can be generated. The visual cue may be selected from a gradient of visual cue values. In some embodiments, a function describes the visual cue output based on the percentile value input to the function.

The input scheme stop specifies particular values of the visual cue for a scheme type. In some embodiments, a scheme stop is described by a percentile value and a visual cue value. For example, the scheme type may be to vary font size, and a user may input (0 percentile, 8 point) as a scheme stop. If scheme block 304 is then passed a percentile value of 0, a font size of 8 point is output by scheme block 304. In some embodiments, multiple scheme stops are passed to scheme block 304. Scheme block 304 may be constrained by all scheme stops. For example, if scheme stops of (50 percentile, 12 point) and (100 percentile, 16 point) are also passed to scheme block 304, scheme block 304 may be constrained by all three scheme stops in generating a visual cue. Scheme stops may be reviewed and modified by a user. For example, a user may be able to delete scheme stops, add new scheme stops, or modify values of existing scheme stops.

In some embodiments, scheme block 304 uses bins to generate visual cues. Scheme stop inputs to scheme block 304 may define a boundary and visual cue for a particular bin. For example, two bins can be defined using the scheme stops (50 percentile, 12 point) and (100 percentile, 16 point). The first bin may have a percentile range of 0-50. For percentile values that fall within that range, a 12 point font size is output. The second bin may have a percentile range of 50-100 and may be associated with a font size of 16 point. Any member of the set of data with a percentile value in that range uses a font size of 16 point.

In some embodiments, scheme block 304 uses a continuously varying gradient instead of bins to generate visual cues. For percentile values not specified by scheme stops, scheme block 304 may interpolate between scheme stops. In some embodiments, both a bin and a gradient are used. For example, font color may be varied based on the number of changes to a file. A first font color may be used for files that have less than five changes. For files with more than five changes, a gradient of font colors can be used where the font color gradually changes from the first color to a second color as the number of changes increases.

The system illustrated is one of a variety of systems that can generate visual cues based on the value of an attribute. In some embodiments, a percentile calculator is not included. The value of an attribute can be passed directly to scheme block 304. Scheme block 304 may be modified accordingly to accept values of attributes as inputs instead of percentile values. In some embodiments, multiple visual cues are displayed for a given member of a set of data. Additional percentile generators and/or scheme blocks may be added to visual cue generator 300 to generate the additional visual cues.

Figure 4:
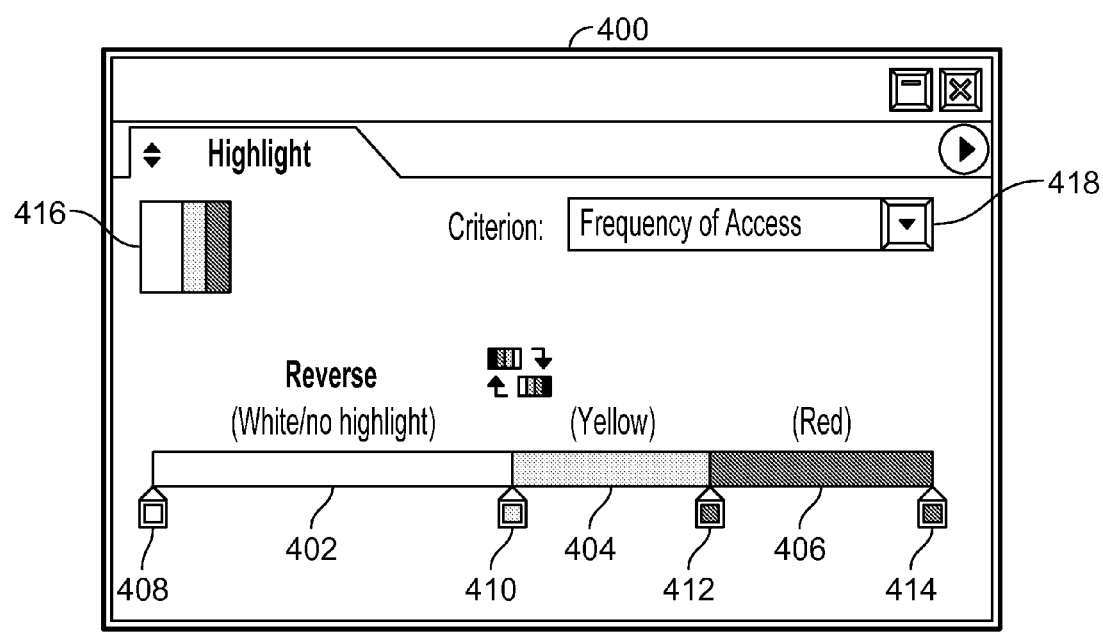
FIG. 4 illustrates an embodiment of a user interface to specify a criterion and scheme stops for a visual cue.

FIG. 4 illustrates an embodiment of a user interface to specify a criterion and scheme stops for a visual cue. In the example shown, a user may interact with highlight window 400 to change bins associated with a visual cue. Low bin 402 is displayed in white to demonstrate that no highlight is applied for members of the set of data that fall into the low bin. Medium bin 404 and high bin 406 are shown in yellow and red, respectively, illustrating the colors used for members of the set of data that fall into those bins.

The boundaries of the bins (and thus the corresponding ranges associated with the bins) are defined by scheme stops 408, 410, 412, and 414. In some embodiments, scheme stops comprise of (percentile value, color). For example, scheme stop 408 may be (0 percentile, no highlight) and scheme stop 410 may be (50 percentile, yellow). Low bin 402 ranges from 0-50, medium bin 404 ranges from 50-75, and high bin 406 ranges from 75-100.

To adjust the number of bins or the associated ranges, a scheme stop may be modified. For example, to create a new low bin, scheme stop 408 may be moved to the right. To change the range of medium bin 404 to 50-60 and high bin 406 to 60-100, scheme stop 412 may be moved left to a point corresponding to 60. To remove a bin, a scheme stop may be deleted, and the two bins previously separated by the deleted scheme stop may be combined. These are some examples of how to modify bins using highlight window 400. Techniques may be employed to further assist a user in adjusting scheme stops. For example, a pop up bubble may be triggered to appear when a user selects a scheme stop and drags the scheme stop to the left or the right. If a scheme stop is dragged to the left, the percentile value displayed in the pop up bubble decreases and vice versa. As a result of changes to the bins, some members of a set of data may be assigned to a new bin and have a new highlight color. In some embodiments, a percentile input box is used where a user may enter an exact percentile value for a selected scheme stop.

To change the color of a highlight, color tool 416 may be used. With an appropriate bin selected, a user may interact with color tool 416 to change the color of the selected bin. For example, clicking on color tool 416 may bring up a color palette from which a user may select a new color to be used for the selected bin. The new color is previewed in window 400 and is used as the color of a highlight in a data view.

Pull down menu 418 is used to select a criterion to generate a visual cue and is currently set to "Access frequency." Visual cues are based on the value of the selected attribute, which in this case is how often a particular member of a set of data is accessed. An access may comprise of a using, selecting, executing, opening, or reading a member of a set of data. Although not shown, pull down menu 418 may also include "Last Access Time" and "Popularity" as selections. If "Last Access Time" is selected, the values of the attributes are the time of the last access. Red highlights may be used for items that were last accessed most recently, and yellow highlights may be used for items that were last accessed somewhat recently. If "Popularity" is selected, the value of the attributes may be a page rank (i.e., the number of other pages that reference a particular object) or some other ranking. Ranking may be assigned by the user, or may be a representative ranking accumulated from multiple users. The most popular items may be highlighted in red, and moderately popular items may be highlighted in yellow.

In some embodiments, additional information may be collected by highlight window 400. For example, the access frequency may be over a window of time. A user may use highlight window 400 to specify whether the access frequency is with respect to the last week, the last month, etc. Additional information collected by highlight window 400 may depend upon the selection in pull down menu 418. For example, if "Popularity" is selected in pull down menu 418, the source of the popularity values may be obtained. A user may specify a third party provider (for example, the Google™ search engine) to provide measurements of popularity (for example, page ranks). In some embodiments, a user may be able to change the type of visual cue to be something other than a highlight using window 400.

FIG. 5 illustrates an embodiment of using colored highlights as visual cues for hyperlinks in a webpage. In the example shown, highlight window 400 is used to control the visual cues generated and the visual cues are based on the access frequency of each hyperlink. The data view in this example is a webpage, and the set of data includes hyperlinks listed on the left hand side of the webpage. In some embodiments, the set of data comprises all hyperlinks in a webpage. In some embodiments, the set of data comprises a subset of hyperlinks. In some embodiments, the set of data can be specified by a user.

Analyst reports hyperlink 500 and financial services hyperlink 502 have red highlights. The red highlights are visual cues indicating that the associated hyperlinks have the highest access frequencies of the hyperlinks in the webpage. Yellow highlights are applied to customer stories hyperlink 504 and PLM hyperlink 506, indicating that those hyperlinks are accessed moderately frequently. The rest of the hyperlinks do not have a highlight, indicating they are accessed with the lowest frequency.

Using highlight window 400, the ranges of the three bins and the associated highlight color may be specified. For example, scheme stop 410 may be moved to the left, so that the three bins have ranges of 0-30, 30-75, and 75-100. Some hyperlinks not currently highlighted may then fall into the medium bin and a yellow highlight may appear over those hyperlinks.

Figure 6:
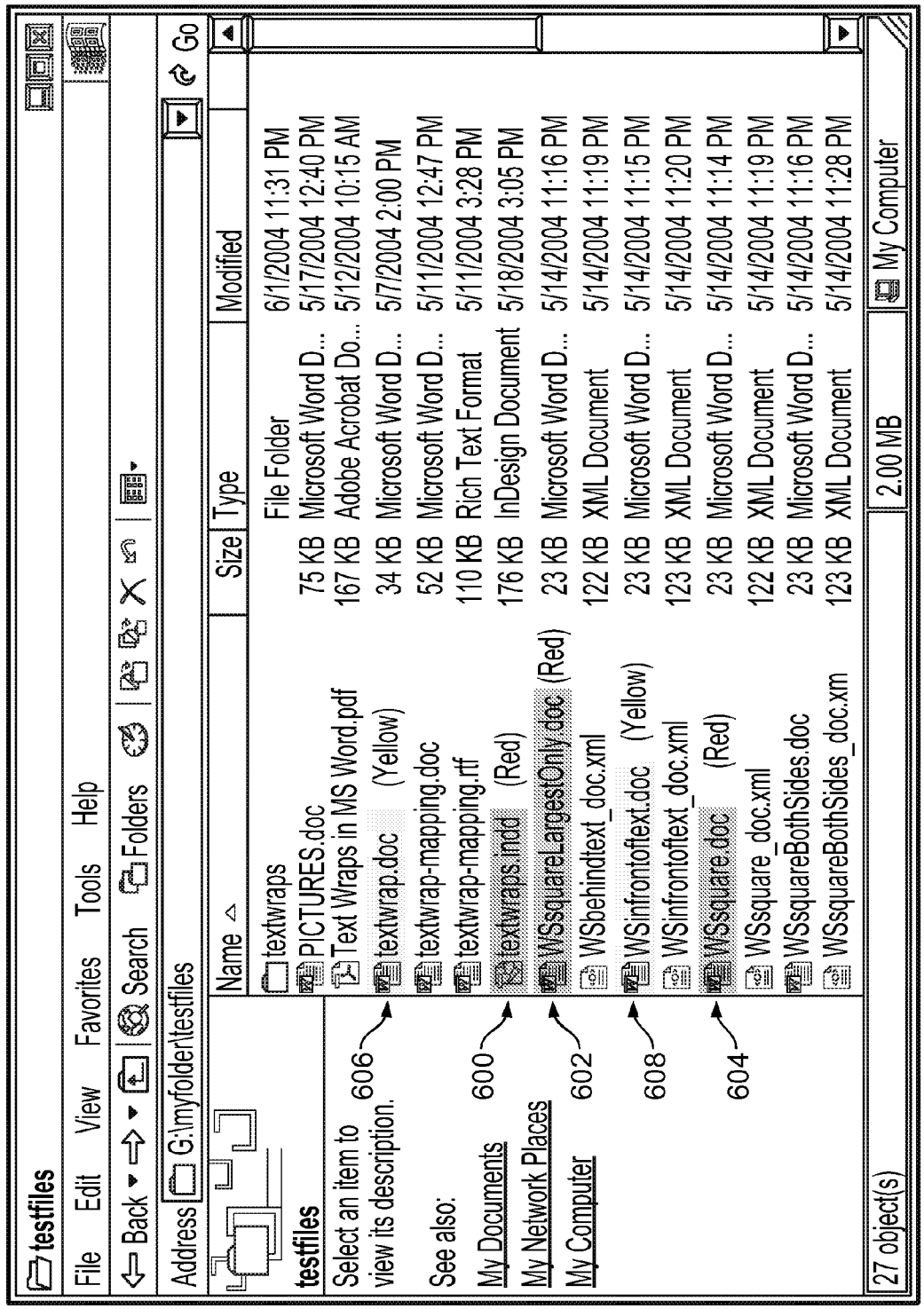
FIG. 6 illustrates an embodiment of using colored highlights as visual cues in a file explorer window.

FIG. 6 illustrates an embodiment of using colored highlights as visual cues in a file explorer window. In the example shown, highlight window 400 is used to control the visual cues generated and the visual cues are based on the access frequency of a file. The data view in this example is a file explorer window. Although in this example the set of data includes all files in this particular directory, in some embodiments the set of data is a subset of the files in a directory.

Files in the file explorer window with a red highlight are accessed most frequently. Files with a red highlight include textwraps file 600, WSsquareLargestOnly file 602, and WSsquare file 604. Textwrap file 606 and WSinfrontoftext file 608 have a yellow highlight, indicating that those files are access moderately frequently. The color of the highlights, the range of attribute values associated with each bin, and the attribute upon which the visual cues are based are controlled using highlight window 400.

In this example, the layout of the data view is maintained. A highlight is a non-disruptive visual cue and does not affect the layout of the file explorer window. The size of the file explorer window is not affected by the visual cue, and the relative placement of the file icons and related information is maintained. The ordering of the list of files is also maintained even though visual cues are displayed. In some embodiments, disruptive visual cues are used. Although a disruptive visual cue may be used, an ordering associated with a displayed set of data may be maintained. For example, if the visual cue is font size, the file explorer window may expand, but the ordering of files in a list may be maintained.

Figure 7:
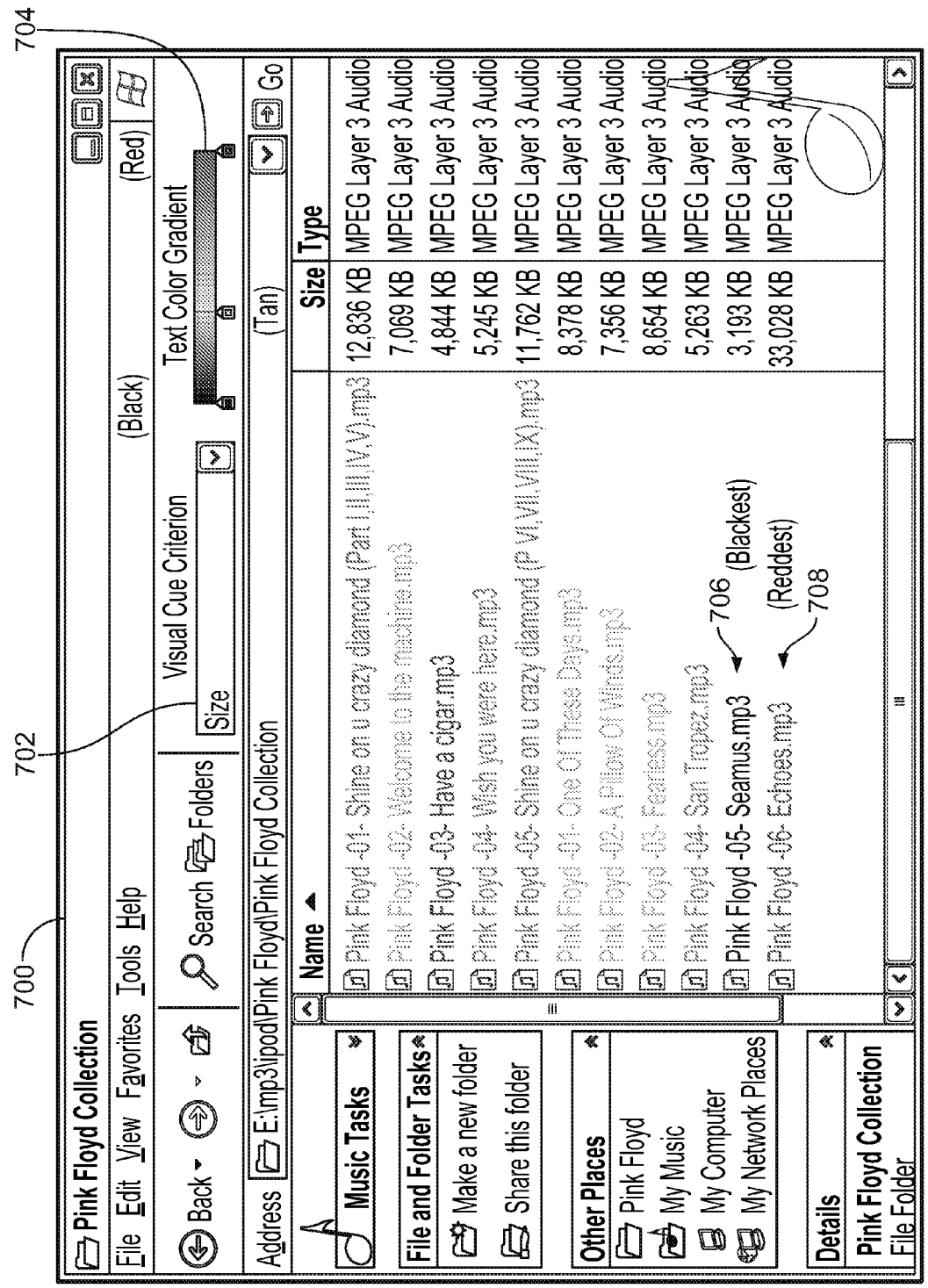
FIG. 7 illustrates an embodiment of using a gradient of font colors as a visual cue.

FIG. 7 illustrates an embodiment of using a gradient of font colors as a visual cue. In the example shown, the data view is file explorer window 700 and the set of data includes audio files in a directory. File explorer window 700 includes criterion pull down menu 702 and color gradient toolbar 704. Using criterion pull down menu 702 and color gradient toolbar 704, a user may adjust the visual cues generated and displayed. By changing the selection of criterion pull down menu 702, the attribute upon which the visual cues are based may be changed. For example, other selections may be "Song duration," "Time created," "Number of times played," "User assigned ranking," or "Tempo." Font color varies based on the selected criterion. Color gradient toolbar 704 includes three scheme stops that can be used to adjust the gradient of font colors. Between scheme stops, a gradient of font colors may be interpolated. A user may add or delete scheme stops, adjust the placement of existing scheme stops within color gradient toolbar 704, or change the color of a scheme stop. The changes to color gradient toolbar 704 correspondingly affect the font color generated and displayed within filed explorer window 700.

Seamus 706 is the smallest audio file in the directory and has a visual cue of the blackest font color. In some embodiments, the font color used for seamus 706 may exactly match the color specified by the minimum (leftmost) scheme stop in color gradient toolbar 704. In some embodiments, the color specified by the minimum scheme stop is associated with a file size of zero and the font color used for seamus 706 may not exactly match that of the minimum scheme stop. Echoes 708 is the largest audio file in the set of data and has the reddest font color. The shade of red used for echoes 708 may exactly match the color specified by the maximum (rightmost) scheme stop.

The other audio files in file explorer window 700 have a font color selected from the gradient of colors in color gradient toolbar 704. Color gradient toolbar 704 includes an intermediate scheme stop that specifies a font color of tan. The position of the intermediate scheme stop may be specified as a percentile value or in units of KB. Between the minimum and intermediate scheme stop, the font color used gradually transitions from black to tan. Between the intermediate scheme stop and the maximum scheme stop, the font color used gradually transitions from tan to red.

Although this embodiment illustrates a file explorer window as the data view, visual cues may be used with other data views. For example, the data view may be the display of a portable audiovisual player, and visual cues may be included in the display. A content player application running on a computer can also be the data view in which audio files are displayed with visual cues.

A user in some embodiments may specify the set of data that the visual cues are applied to. For example, a user may be interested in the first six audio files listed in file explorer window 700. The user may specify what comprises the set of data, and visual cues are generated for the specified set of data. No visual cue is displayed for the other audio files. To differentiate from the black font color used for small files, the other audio files may be removed from the display, or may be displayed in a manner that a user does not mistake for a visual cue. In some embodiments, the set of data comprises all objects of a particular type in a data view.

In some embodiments, visual cues can be turned off and on. For example, file explorer window 700 may have a feature that enables the visual cue, in this case font color, to be turned off. A selection from one of the pull down menus or a defined sequence or combination of inputs from an input device (such as a mouse, a stylus, or a keyboard) may be associated with turning off or turning on the display of visual cues.

Figure 8:
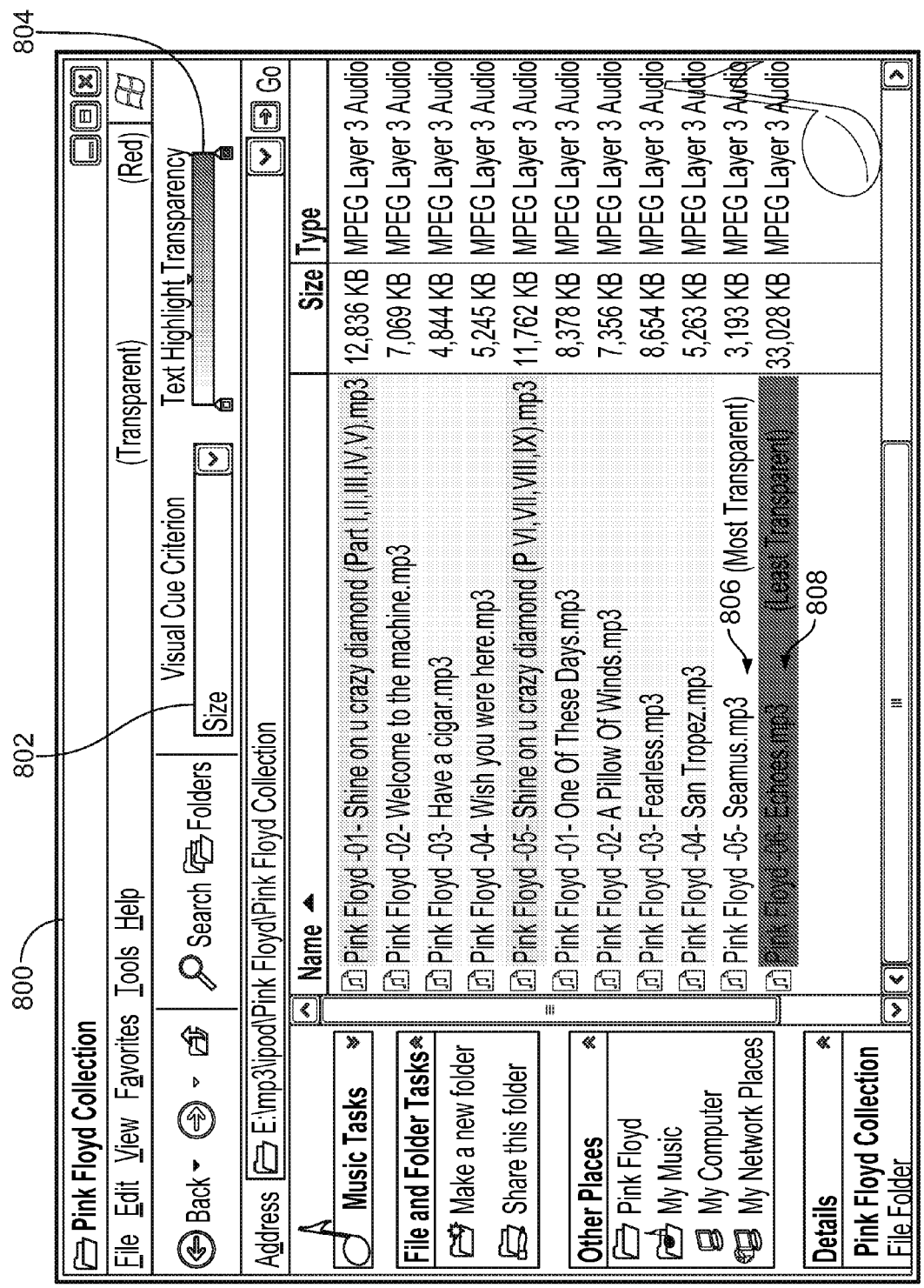
FIG. 8 illustrates an embodiment of using a gradient of highlight transparencies as visual cues.

FIG. 8 illustrates an embodiment of using a gradient of highlight transparencies as visual cues. In the example shown, the data view is file explorer window 800 and the set of data comprises of audio files in a particular directory. In some embodiments, the data view and/or the set of data may comprise objects other than a file explorer window and audio files in a directory. For example, transparent highlights may be used as visual cues for entries in an address book of an email application or a list of contacts in an instant messaging application running on a computer.

In the example shown, the degree of transparency of a highlight indicates an audio file's size. File explorer window 800 includes criterion pull down menu 802 and highlight gradient toolbar 804 which control generation of the visual cues. Seamus 806 has the most transparent highlight. The extreme degree of transparency indicates that the associated audio file is the smallest file in the set of data. As files grow larger, the associated highlights become less transparent. The largest file, echoes 808, has the least transparent highlight. If the list is rearranged according to file size, the degree of transparency of the highlights going down the list would gradually decrease.

Figure 9:
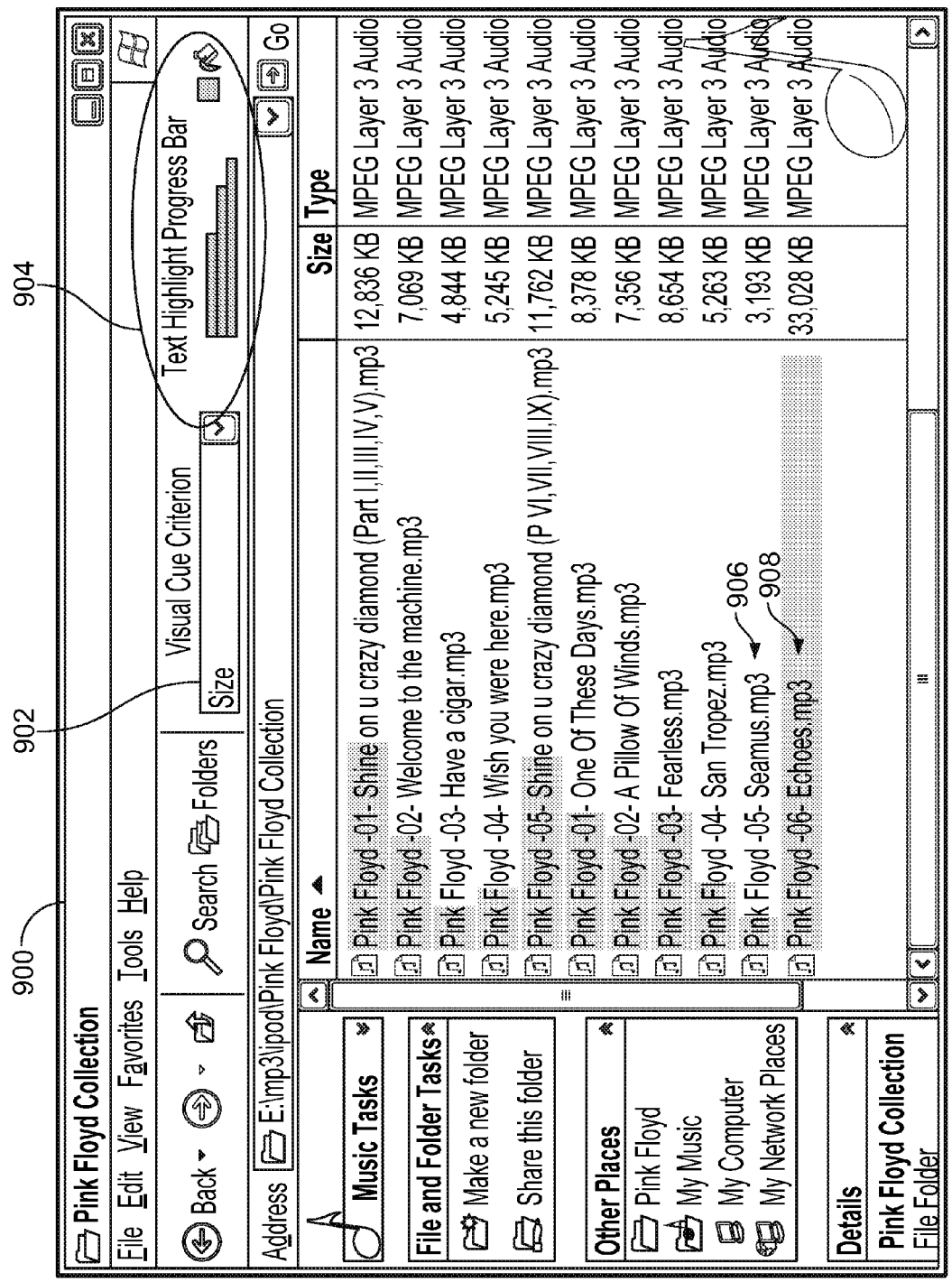
FIG. 9 illustrates an embodiment of using progress bars of varying lengths as visual cues.

FIG. 9 illustrates an embodiment of using progress bars of varying lengths as visual cues. In the example shown, a progress bar is used to indicate the size of an associated audio file. As with the previous examples, the data view is file explorer window 900 and the set of data comprises of audio files in a particular directory. A progress bar may be used with other data views or other sets of data.

Criterion pull down menu 902 and progress bar controller 904 are included in file explorer window 900 and may be used to control the visual cues. For example, the color of the progress bars may be changed using progress bar controller 904. The length of each progress bar represents the size of an associated file. For example, the size MP3 file 906 (Seamus) is 3,193 KB and the size of MP3 file 908 (Echoes) is 33,029 K. As a result, the length of the progress bar for MP3 file 906 is shorter than that for MP3 file 908. In this example, the lengths of the progress bars vary with the width of the name column. If the name column is expanded, the lengths of the progress bars display may accordingly expand as well. The longest progress bar may precisely fit the width of a column in which it is located.

Other configurations of progress bars may be employed. For example, the progress bars can be aligned along the right edge of the column and project from right to left. Progress bars may extend across the size and type columns in addition to the name column. Although the visual cues would take up more of file explorer window 900, the additional columns occupied by the visual cues may enable finer distinctions. For example, two files with similar sizes may be more readily distinguishable. In some embodiments, progress bars have a vertical orientation instead of a horizontal orientation.

Figure 10:
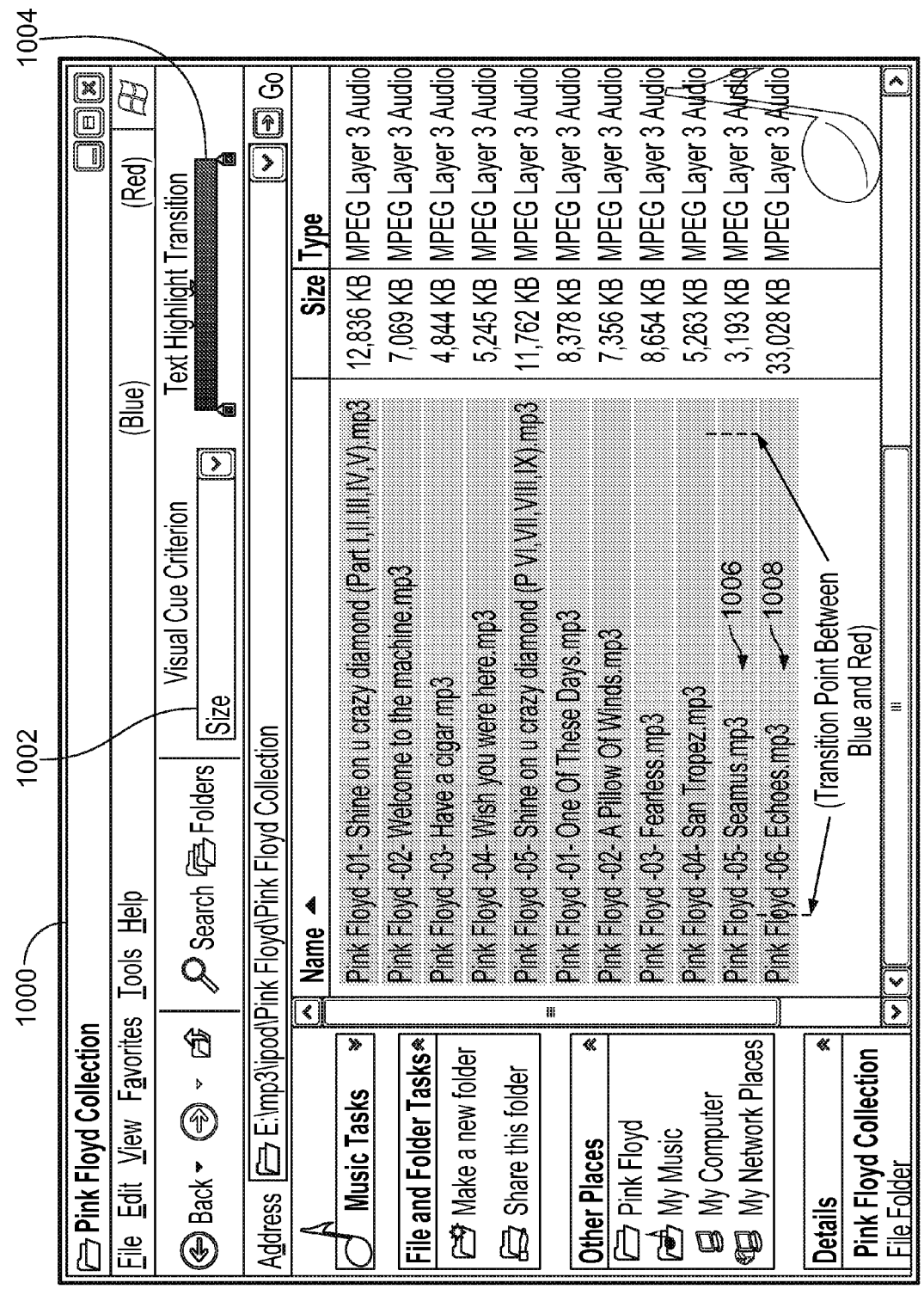
FIG. 10 illustrates an embodiment of using a transitioning highlight as a visual cue.

FIG. 10 illustrates an embodiment of using a transitioning highlight as a visual cue. In the example window 1000 shown, a highlight transitions from a first color to a second color at varying points, based on the size of an audio file. Going from left to right, the highlight for the smallest audio file, seamus 1006, is the first highlight to transition from blue to red. As file size increases, the transition point of a highlight changes further along the highlight going from left to right. The highlight for echoes 1008, the largest audio file in the set of data, is the last highlight to transition from blue to red going from left to right. The highlights are scaled in this example to fit within the names column. Expanding or shrinking the width of the names column causes the highlights to expand or shrink as well.

The visual cues may be modified using criterion pull down menu 1002 and highlight transition toolbar 1004. To change the colors used, currently red and blue, a user may use the highlight transition toolbar 1004. To change the attribute upon which the visual cues are based, criterion pull down menu 1002 may be used. Other options presented by criterion pull down menu 1002 can allow a visual cue to be based on metadata associated with an audio file, such as a user assigned ranking, a date associated with the audio file, the song duration, the tempo of a song, the number of times played, etc.

Figure 11:
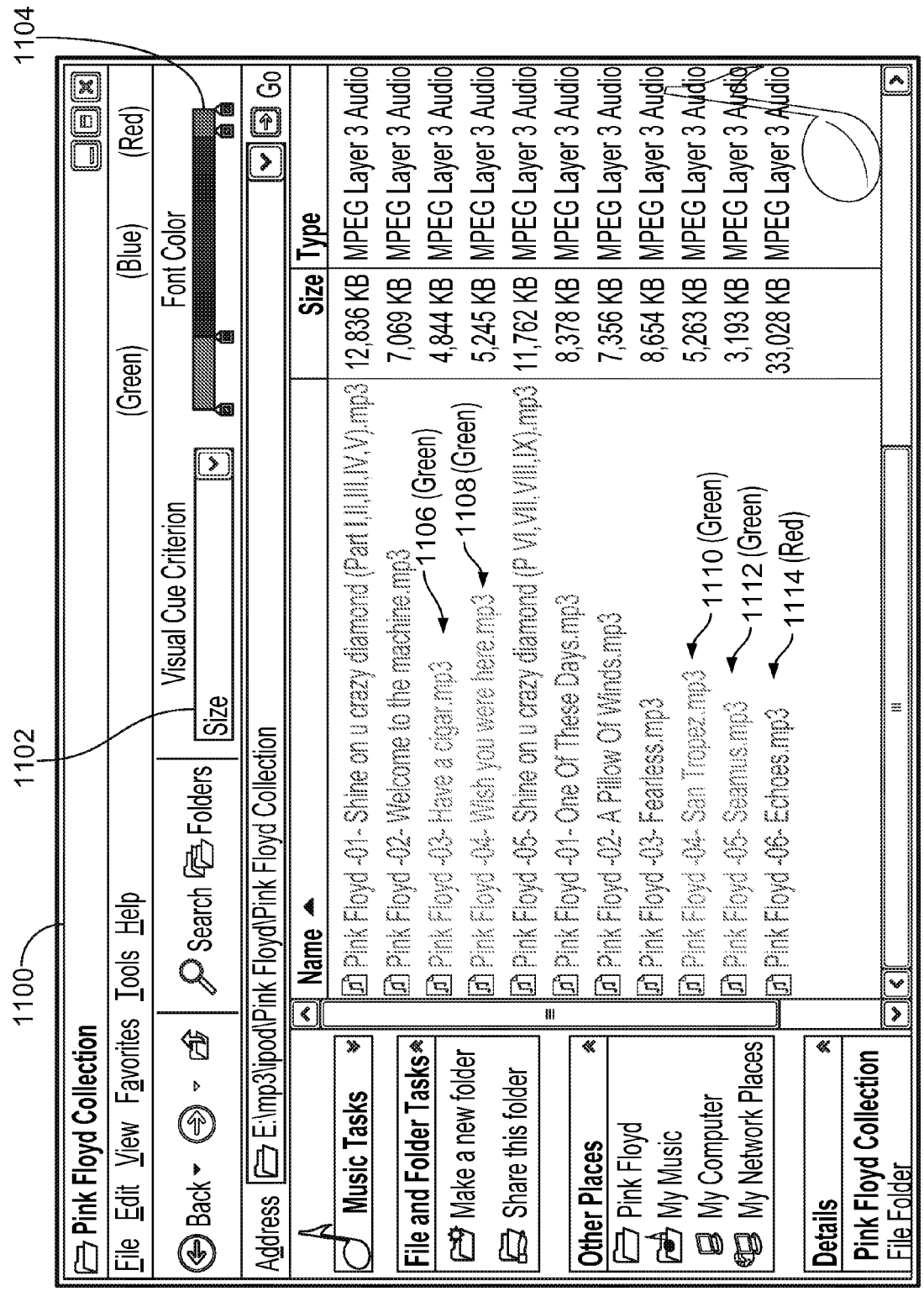
FIG. 11 illustrates an embodiment of using a finite number of font colors used as visual cues.

FIG. 11 illustrates an embodiment of using a finite number of font colors used as visual cues. In the example window 1100 shown, criterion pull down menu 1102 is set to "size." In this example, three bins are defined that divide the members of the set of data into three groups based on file size. Each bin is associated with a particular font color. Font color toolbar 1104 provides a preview and allows a user to modify the bins or an associated color. A font color of green is associated with the low bin, a font color of blue is associated with the medium bin, and a font color of red is associated with the high bin. Audio files 1106, 1108, 1110, and 1112 have the smallest file sizes and fall into the low bin. The names of these files are displayed in green, a visual cue that the sizes of those files are small. Echoes file 1114 is the largest file in the set of data and the name of the file is displayed in red. In this example, the range associated with the high bin has a narrow range of values, and no other files fall into the high bin and have a red font color. The remainder of the files are displayed in blue, indicating they fall into the medium bin and have medium file sizes.

Figure 12:
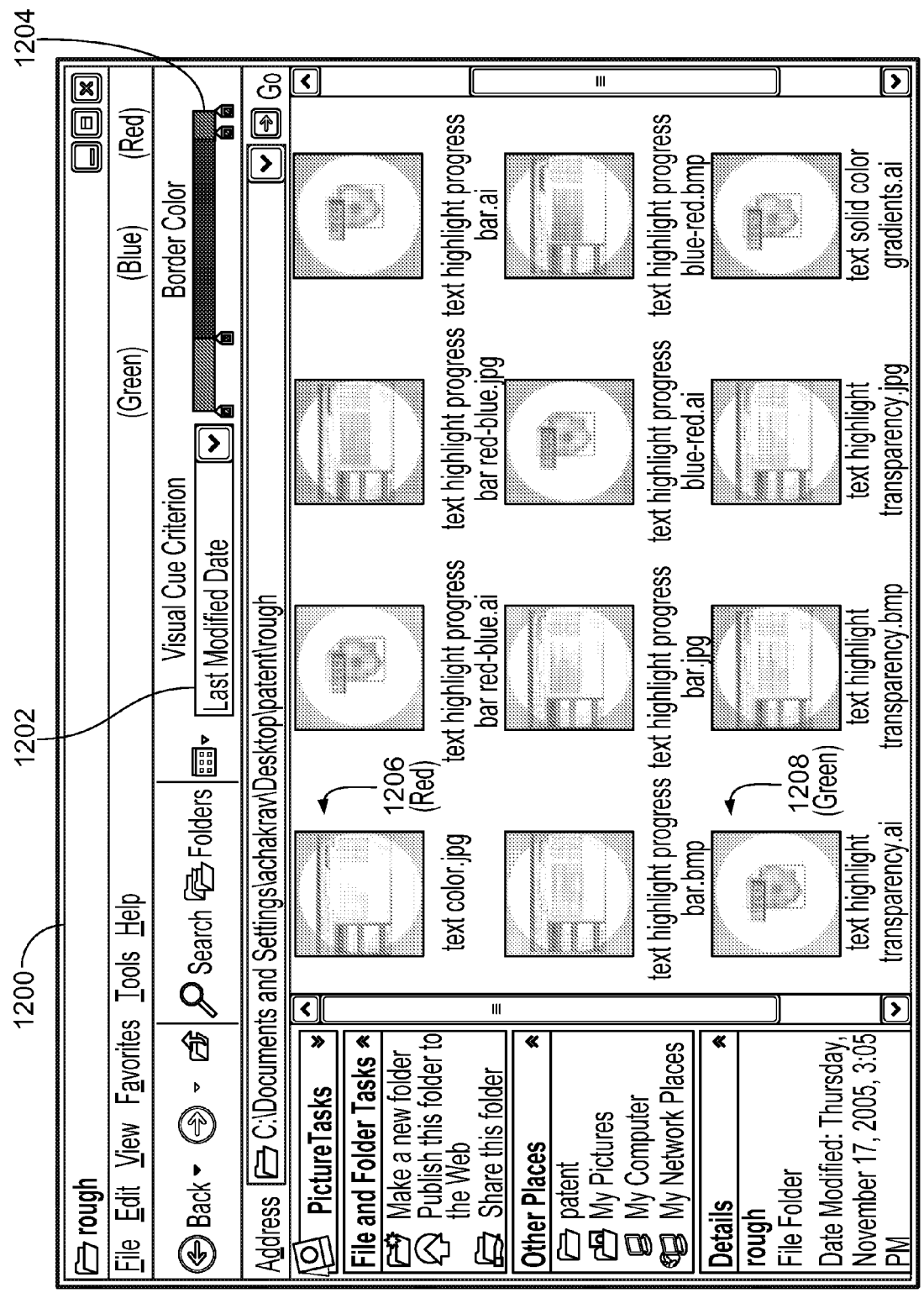
FIG. 12 illustrates an embodiment of using a colored border as a visual cue.

FIG. 12 illustrates an embodiment of using a colored border as a visual cue. In the example shown, the set of data includes images and the data view is file explorer window 1200. In some embodiments, the data view is the display of a digital camera, a printer, or a cellular phone capable of taking a picture. File explorer window 1200 has visual representations of the images. A thumbnail, such as thumbnail 1206, is one type of a visual representation and is a preview of the image. A change to the image causes the associated thumbnail to change. Icons, such as icon 1208, are a fixed representation of a file and do not depend upon the content of the image. Unique icons can be used for files in different formats: one icon can be used for JPEG images (.jpg extension) and another icon can be used for bitmap images (.bmp extension).

Border color toolbar 1204 illustrates three bins defined for this example visual cue. The spacing of the scheme stops in border color toolbar 1204 define the boundaries of the bins. Each of the images in file explorer window 1200 is assigned a particular border color based on border color toolbar 1204. In this particular example, criterion pull down menu 1202 is set to "last modified date." A red border surrounds thumbnail 1206, indicating that the image, named "text color.jpg", has a last modification date that falls into the high bin and has been edited relatively recently. Icon 1208 has a green border, indicating that the image "text highlight transparency.ai" has last modification date in the low bin and was modified relatively some time ago. In some embodiments, different borders are used besides a circle within a square.

In some embodiments, multiple visual cues are displayed. The following figure illustrates one embodiment of displaying multiple cues. Different combinations of visual cues may be employed in other embodiments.

Figure 13:
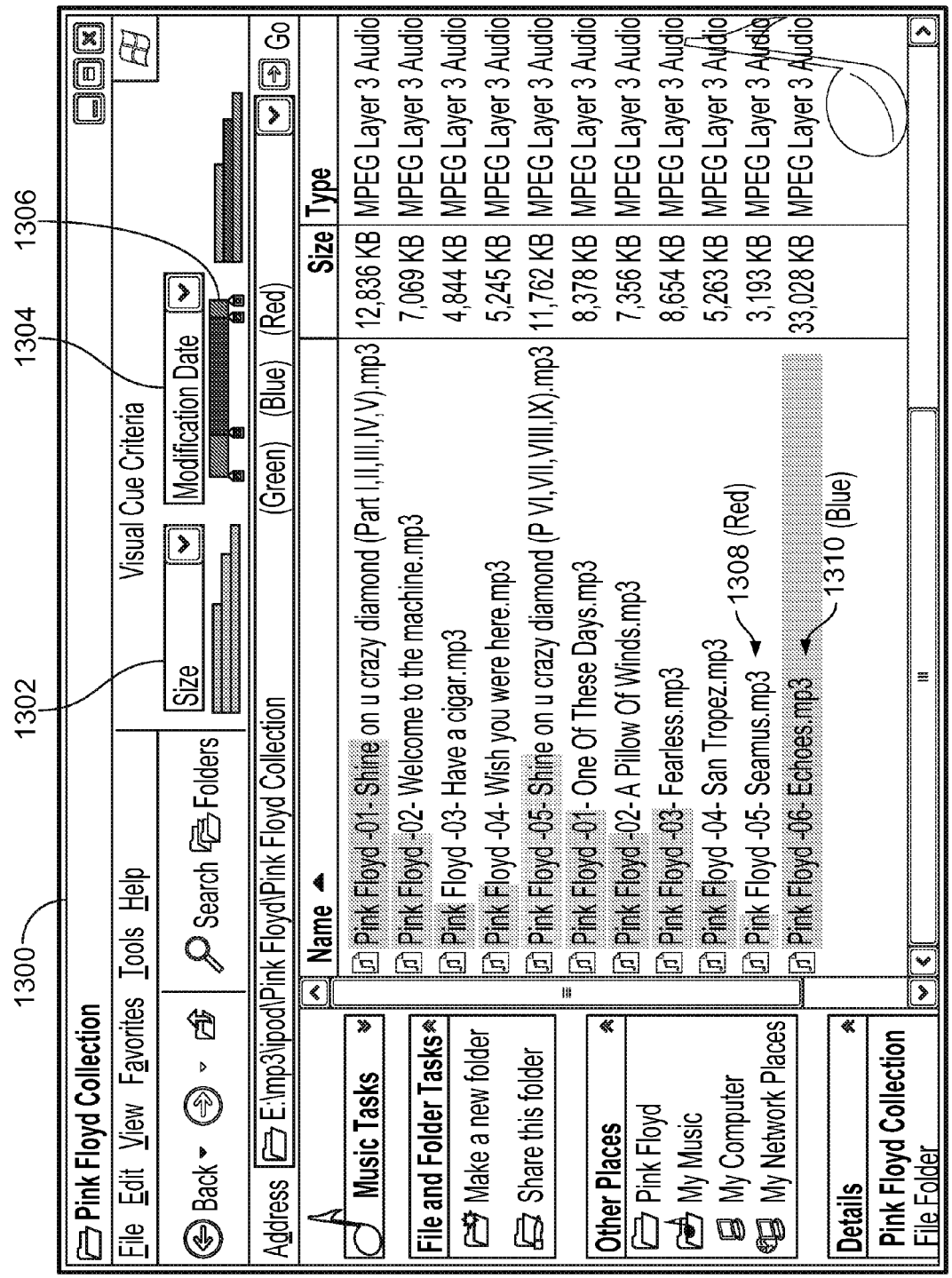
FIG. 13 illustrates an embodiment of displaying multiple visual cues.

FIG. 13 illustrates an embodiment of displaying multiple visual cues. In the example shown, file explorer window 1300 includes criterion pull down menus 1302 and 1304, which are associated with a first visual cue and a second visual cue, respectively. Criterion pull down menus 1302 and 1304 are used to select a criterion for each visual cue and are currently set to "Size" and "Modification date." The first visual cue is therefore a progress bar with a length that varies based on the size of each audio file. The second visual cue is the color of the progress bar, where the color varies based on the modification date of each audio file. Different criterion may be selected for the first visual cue and second visual cue using the appropriate pull down menu.

Seamus 1308 is the smallest audio file and accordingly has the shortest progress bar. The second column of file explorer window 1300 shows the sizes of the audio files. The largest audio file is echoes 1310 and it has the longest progress bar. The color of the progress bars indicate the modification date of each audio file. As bar color toolbar 1306 illustrates, red is used for audio files with the newest modification dates, blue for files with modification dates in the medium range, and green for files with the oldest modification dates. Seamus 1308 has one of the newest modification dates and its progress bar is red. The progress bar of echoes 1310 is blue, indicating that it has modification date in the medium range with respect to the other audio files.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining a first value of an attribute for a member of a set of references to webpages, wherein the attribute includes a page rank associated with a reference to a webpage;
    determining, at a processor, a visual cue, which includes a color, for the member based at least in part on the first value of the attribute, wherein determining the visual cue includes determining the color based at least in part on the page rank;
    displaying, via a display, a representation of the member using the determined color, wherein the determined color provides an indication of a page rank of the member; and
    in the event the attribute for the member changes from the first value to a second value:
        obtaining the second value;
        determining, at the processor, an updated visual cue that includes an updated color based at least in part on the second value of the attribute according to the same determination process that was used to determine the color based at least in part on the first value of the attribute; and
        updating the display to substantially instantaneously change from the visual cue that includes the color to the updated visual cue that includes the updated color,
    wherein:
        the visual cue includes a text highlight progress bar applied as a highlight over a text representation of the member;
        a length of the text highlight progress bar provides an indication of the page rank of the member; and
        determining the visual cue includes determining the length of the text highlight progress bar based at least in part on the page rank of the member.

2. A method as recited in claim 1, wherein displaying the visual cue includes at least one of the following: maintaining a layout, rendering the visual cue on a separate layer, or basing the determination on another member's value of the attribute.

3. A method as recited in claim 1, wherein the value of the attribute includes a percentile value.

4. A method as recited in claim 1, wherein:
    the visual cue includes a highlight color where the highlight color provides an indication of the page rank of the member;
    determining the visual cue includes determining the highlight color based at least in part on the page rank of the member; and
    displaying the visual cue includes displaying the representation of the member with the determined highlight color.

5. A method as recited in claim 1, wherein:
    the visual cue includes a font color where the font color provides an indication of the page rank of the member;
    determining the visual cue includes determining the font color based at least in part on the page rank of the member; and
    displaying the visual cue includes displaying the representation of the member with the determined font color.

6. A method as recited in claim 1, wherein the visual cue includes a time varying visual cue.

7. A method as recited in claim 1, wherein the visual cue is displayed in a webpage.

8. A method as recited in claim 1, wherein the visual cue for at least one member of the set of data comprises of no change to a visual representation for that member.

9. A method as recited in claim 1 further including obtaining a scheme stop used in determining the visual cue, wherein the scheme stop includes information associated with a specified value of the attribute.

10. A method as recited in claim 1, wherein:
    the visual cue includes a font color where the font color provides an indication of the page rank of the member; and
    determining the visual cue includes:
        determining which one of a plurality of ranges the page rank of the member falls within; and
        selecting, as the font color, a color associated with the range that the page rank falls within.

11. A method as recited in claim 1, wherein:
    the visual cue includes a border color where the border color provides an indication of the page rank of the member; and
    determining the visual cue includes:
        determining which one of a plurality of ranges the page rank of the member falls within; and
        selecting, as the border color, a color associated with the range that the page rank falls within.

12. A method as recited in claim 1, wherein:
the order in which the set of references to webpages is displayed is independent of page rank; and
displaying includes refraining from changing the order in which the set of references to webpages is displayed.

13. A system, comprising:
a processor; and
a memory coupled with the processor, wherein the memory is configured to provide the processor with instructions which when executed cause the processor to:
obtain a first value of an attribute for a member of a set of references to webpages, wherein the attribute includes a page rank associated with a reference to a webpage;
determine a visual cue, which includes a color, for the member based at least in part on the first value of the attribute, wherein determining the visual cue includes determining the color based at least in part on the page rank;
display, via a display, a representation of the member using the determined color, wherein the determined color provides an indication of a page rank of the member; and
in the event the attribute for the member changes from the first value to a second value:
obtain the second value;
determine an updated visual cue that includes an updated color based at least in part on the second value of the attribute according the same determination process that was used to determine the color based at least in part on the first value of the attribute; and
update the display to substantially instantaneously change from the visual cue that includes the color to the updated visual cue that includes the updated color, wherein:
the visual cue includes a text highlight progress bar applied as a highlight over a text representation of the member;
a length of the text highlight progress bar provides an indication of the page rank of the member; and
determining the visual cue includes determining the length of the text highlight progress bar based at least in part on the page rank of the member.

14. A system as recited in claim 13, wherein:
the visual cue includes a highlight color where the highlight color provides an indication of the page rank of the member;
the instructions for determining the visual cue include instructions for determining the highlight color based at least in part on the page rank of the member; and
the instructions for displaying the visual cue include instructions for displaying the representation of the member with the determined highlight color.

15. A system as recited in claim 13, wherein:
the visual cue includes a font color where the font color provides an indication of the page rank of the member;
the instructions for determining the visual cue include instructions for determining the font color based at least in part on the page rank of the member; and
the instructions for displaying the visual cue include instructions for displaying the representation of the member with the determined font color.

16. A system as recited in claim 13, wherein determining the visual cue includes:
the visual cue includes a font color where the font color provides an indication of the page rank of the member; and
determining the visual cue includes:
determining which one of a plurality of ranges the page rank of the member falls within; and
selecting, as the font color, a color associated with the range that the page rank falls within.

17. A system as recited in claim 13, wherein:
the visual cue includes a border color where the border color provides an indication of the page rank of the member; and
determining the visual cue includes:
determining which one of a plurality of ranges the page rank of the member falls within; and
selecting, as the border color, a color associated with the range that the page rank falls within.

18. A system as recited in claim 13, wherein:
the order in which the set of references to webpages is displayed is independent of page rank; and
displaying includes refraining from changing the order in which the set of references to webpages is displayed.

19. A computer program product, the computer program product being embodied in a non-transitory computer readable storage medium and comprising computer instructions for:
obtaining a first value of an attribute for a member of a set of references to webpages, wherein the attribute includes a page rank associated with a reference to a webpage;
determining a visual cue, which includes a color, for the member based at least in part on the first value of the attribute, wherein determining the visual cue includes determining the color based at least in part on the page rank;
displaying, via a display, a representation of the member using the determined color, wherein the determined color provides an indication of a page rank of the member; and
in the event the attribute for the member changes from the first value to a second value:
obtaining the second value;
determining an updated visual cue that includes an updated color based at least in part on the second value of the attribute according the same determination process that was used to determine the color based at least in part on the first value of the attribute; and
updating the display to substantially instantaneously change from the visual cue that includes the color to the updated visual cue that includes the updated color, wherein:
the visual cue includes a text highlight progress bar applied as a highlight over a text representation of the member;
a length of the text highlight progress bar provides an indication of the page rank of the member; and
determining the visual cue includes determining the length of the text highlight progress bar based at least in part on the page rank of the member.

20. A computer program product as recited in claim 19, wherein:
the visual cue includes a highlight color where the highlight color provides an indication of the page rank of the member;
the computer instructions for determining the visual cue include computer instructions for determining the highlight color based at least in part on the page rank of the member; and the computer instructions for displaying the visual cue include computer instructions for displaying the representation of the member with the determined highlight color.

21. A computer program product as recited in claim 19, wherein:
the visual cue includes a font color where the font color provides an indication of the page rank of the member;
the computer instructions for determining the visual cue include computer instructions for determining the font color based at least in part on the page rank of the member; and
the computer instructions for displaying the visual cue include computer instructions for displaying the representation of the member with the determined font color.

22. A computer program product as recited in claim 16, wherein determining the visual cue includes:
the visual cue includes a font color where the font color provides an indication of the page rank of the member; and
determining the visual cue includes:
determining which one of a plurality of ranges the page rank of the member falls within; and
selecting, as the font color, a color associated with the range that the page rank falls within.

23. A computer program product as recited in claim 19, wherein:
the visual cue includes a border color where the border color provides an indication of the page rank of the member; and
determining the visual cue includes:
determining which one of a plurality of ranges the page rank of the member falls within; and
selecting, as the border color, a color associated with the range that the page rank falls within.

24. A computer program product as recited in claim 19, wherein:
the order in which the set of references to webpages is displayed is independent of page rank; and
displaying includes refraining from changing the order in which the set of references to webpages is displayed.

25. A method comprising:
obtaining a first value of an attribute for a member of a set of references to webpages, wherein the attribute includes a page rank associated with a reference to a webpage;
determining, at a processor, a visual cue, which includes a color, for the member based at least in part on the first value of the attribute, wherein determining the visual cue includes determining the color based at least in part on the page rank;
displaying, via a display, a representation of the member using the determined color, wherein the determined color provides an indication of a page rank of the member; and
in the event the attribute for the member changes from the first value to a second value:
obtaining the second value;
determining, at the processor, an updated visual cue that includes an updated color based at least in part on the second value of the attribute according the same determination process that was used to determine the color based at least in part on the first value of the attribute; and
updating the display to substantially instantaneously change from the visual cue that includes the color to the updated visual cue that includes the updated color, wherein:
the visual cue includes a text highlight transition applied as a highlight over a text representation of the member;
a transition point at which the highlight changes from a first color to a second color provides an indication of the page rank of the member; and
determining the visual cue includes determining the transition point at which the highlight changes from the first color to the second color based at least in part on the page rank of the member.

26. A system, comprising:
a processor; and
a memory coupled with the processor, wherein the memory is configured to provide the processor with instructions which when executed cause the processor to:
obtain a first value of an attribute for a member of a set of references to webpages, wherein the attribute includes a page rank associated with a reference to a webpage;
determine a visual cue, which includes a color, for the member based at least in part on the first value of the attribute, wherein determining the visual cue includes determining the color based at least in part on the page rank;
display, via a display, a representation of the member using the determined color, wherein the determined color provides an indication of a page rank of the member; and
in the event the attribute for the member changes from the first value to a second value:
obtain the second value;
determine an updated visual cue that includes an updated color based at least in part on the second value of the attribute according the same determination process that was used to determine the color based at least in part on the first value of the attribute; and
update the display to substantially instantaneously change from the visual cue that includes the color to the updated visual cue that includes the updated color, wherein:
the visual cue includes a text highlight transition applied as a highlight over a text representation of the member;
a transition point at which the highlight changes from a first color to a second color provides an indication of the page rank of the member; and
determining the visual cue includes determining the transition point at which the highlight changes from the first color to the second color based at least in part on the page rank of the member.

27. A computer program product, the computer program product being embodied in a non-transitory computer readable storage medium and comprising computer instructions for:
obtaining a first value of an attribute for a member of a set of references to webpages, wherein the attribute includes a page rank associated with a reference to a webpage;
determining a visual cue, which includes a color, for the member based at least in part on the first value of the attribute, wherein determining the visual cue includes determining the color based at least in part on the page rank;

displaying, via a display, a representation of the member using the determined color, wherein the determined color provides an indication of a page rank of the member; and in the event the attribute for the member changes from the first value to a second value:
obtaining the second value;
determining an updated visual cue that includes an updated color based at least in part on the second value of the attribute according the same determination process that was used to determine the color based at least in part on the first value of the attribute; and updating the display to substantially instantaneously change from the visual cue that includes the color to the updated visual cue that includes the updated color, wherein:
the visual cue includes a text highlight transition applied as a highlight over a text representation of the member;
a transition point at which the highlight changes from a first color to a second color provides an indication of the page rank of the member; and
determining the visual cue includes determining the transition point at which the highlight changes from the first color to the second color based at least in part on the page rank of the member.

* * * * *